Apr. 17, 1923.
G. JAQUETTE
1,451,776
MEAT SLICING MACHINE
Filed Nov. 21, 1921
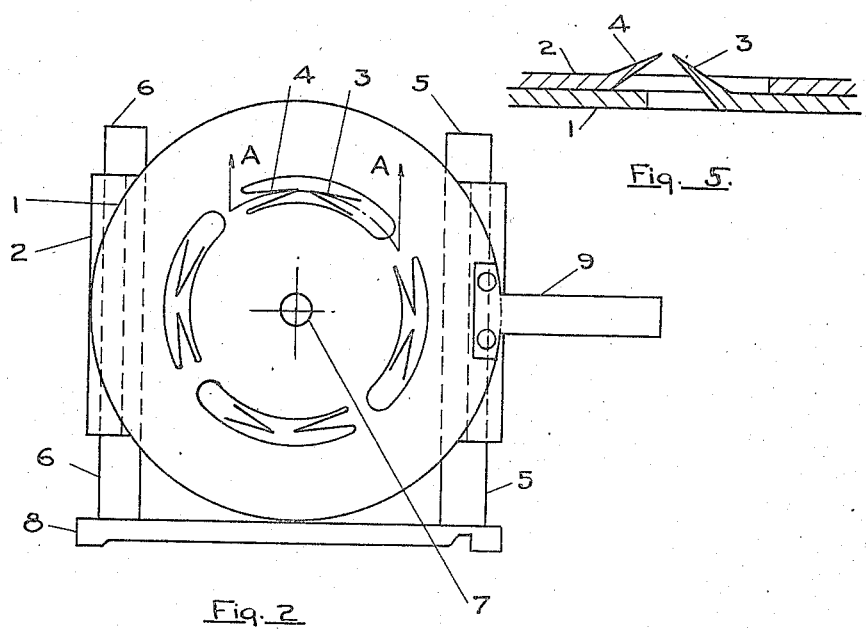
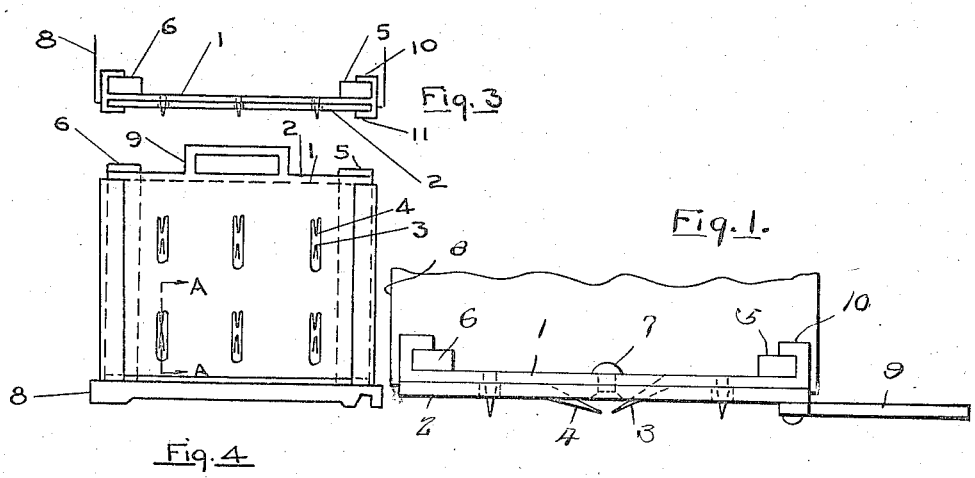
INVENTOR.

Patented Apr. 17, 1923.

1,451,776

UNITED STATES PATENT OFFICE.

GRANTHAM JAQUETTE, OF PHILADELPHIA, PENNSYLVANIA.

MEAT-SLICING MACHINE.

Application filed November 21, 1921. Serial No. 516,855.

*To all whom it may concern:*

Be it known that I, GRANTHAM JAQUETTE, a citizen of the United States, residing at Philadelphia, State of Pennsylvania, have invented certain new and useful Improvements in Meat-Slicing Machines, of which the following is a specification, reference being had to the accompanying drawings, forming a part of this specification.

My invention relates to meat slicing machines having a meat table and means for holding thereon short ends of meat which are too short to be held by a clamp. My invention has for its object, to provide a simple and effective construction for said meat-holding device, which is commonly known as a meat-end plate.

Referring to the drawings, Fig. 1 is a view of the meat end plate, together with a fragment of the meat table and the clamp posts. Fig. 2 is a front elevation of these parts. Figs. 3 and 4 show the same parts as Figs. 1 and 2, but with a different arrangement. Fig. 5 shows a cross section view taken through a pair of teeth on line A—A.

The reference numbers indicate similar parts in each place where they appear. The essential point of construction in my invention comprises two plates or frames 1 and 2, which are either pivotal respecting one another as in Fig. 1, or slidable as shown in Figs. 3 and 4. In Fig. 1 and likewise in Fig. 2, the plates 1 and 2 are shown pivotal upon pivot 7, which is shown in the center of the plates. However, the pivot may be located at any suitable point. Plate 1 has attached to it teeth 3 which extend through openings in plate 2 and engage with teeth mounted thereon to hold the meat. Any suitable number of teeth may be used. Plate 1 is fitted with hooks 10 which hold the entire device to posts 5 and 6, said posts being a part of all meat slicing machines. In Figs. 3 and 4, flanges 11 serve as a slide for plate 2, said flanges being integral with plate 1. 8 is a fragment of the meat table which is common to all slicing machines now in use. The handle 9 is for moving plate 2 relative to plate 1 in order to engage or disengage teeth 3 and 4, thus grasping or releasing the meat. Fig. 3 shows two teeth in detail, and their manner of engaging as described above.

It will be noted that teeth 3 and 4 are formed by stamping out suitable portions of plates 1 and 2 and bending same outward therefrom at an angle. This construction has two purposes, viz.:—(1) It eliminates the crevice which is inevitable in constructions involving the attachment of separate teeth to the plate. In such crevices small portions of meat may collect and putrefy, and cannot be washed out. (2) The construction is also more simple, for two reasons, viz. (a) It is less troublesome to stamp the teeth from the plate than to make separate teeth and attach them thereto. (b) Being arranged at a suitable angle with the plate, teeth in my invention will engage the meat and draw it tightly against the plate, whereas in former instances similar to this, it has been necessary to move the teeth forward to engage the meat and enter into same.

I claim:

In combination a meat slicing machine having a reciprocating carriage, a meat table thereon and means for holding short ends of meat comprising a plate provided with openings with teeth thereon projecting from wall of said openings at an angle to the surface of said plate, and a plate having teeth thereon which protrude therefrom at an angle and extend through the aforesaid openings in the first mentioned plate and cooperate with the teeth on said first mentioned plate to draw the meat firmly against the first mentioned plate, the teeth on both said plates being integral with the plates and formed of the substance thereof.

In testimony whereof I hereunto affix my signature.

GRANTHAM JAQUETTE.

Witnesses:
HOWARD J. BLUMRICK,
JOEL GAHUSE.